United States Patent
Ledebohm (10) Patent No.: US 7,340,547 B1
(45) Date of Patent: Mar. 4, 2008

(54) SERVICING OF MULTIPLE INTERRUPTS USING A DEFERRED PROCEDURE CALL IN A MULTIPROCESSOR SYSTEM

(75) Inventor: Herbert O. Ledebohm, Round Rock, TX (US)

(73) Assignee: Nvidia Corporation, Santa Clara, CA (US)

( * ) Notice: Subject to any disclaimer, the term of this patent is extended or adjusted under 35 U.S.C. 154(b) by 273 days.

(21) Appl. No.: 10/726,351

(22) Filed: Dec. 2, 2003

(51) Int. Cl.
G06F 13/24 (2006.01)
G06F 13/26 (2006.01)
G06F 13/32 (2006.01)
G06F 12/00 (2006.01)
G06F 12/14 (2006.01)

(52) U.S. Cl. ............ 710/260; 710/262; 710/263; 710/264; 710/268; 710/200

(58) Field of Classification Search ........ 710/260, 710/200, 262–264, 268
See application file for complete search history.

(56) References Cited

U.S. PATENT DOCUMENTS

| | | | |
|---|---|---|---|
| 5,446,910 A * | 8/1995 | Kennedy et al. | 710/119 |
| 5,542,076 A * | 7/1996 | Benson et al. | 710/260 |
| 5,708,814 A * | 1/1998 | Short et al. | 710/260 |
| 5,790,130 A | 8/1998 | Gannett | |
| 5,841,444 A | 11/1998 | Mun | |
| 5,867,687 A * | 2/1999 | Simpson | 710/264 |
| 6,023,281 A | 2/2000 | Grigor et al. | |
| 6,078,339 A | 6/2000 | Meinerth et al. | |
| 6,191,800 B1 | 2/2001 | Arenburg et al. | |
| 6,259,461 B1 | 7/2001 | Brown | |
| 6,266,072 B1 | 7/2001 | Koga et al. | |
| 6,282,601 B1 * | 8/2001 | Goodman et al. | 710/260 |
| 6,317,133 B1 | 11/2001 | Root et al. | |
| 6,362,818 B1 | 3/2002 | Gardiner et al. | |
| 6,445,391 B1 | 9/2002 | Sowizral et al. | |
| 6,469,746 B1 | 10/2002 | Maida | |
| 6,473,086 B1 | 10/2002 | Morein et al. | |
| 6,570,571 B1 | 5/2003 | Morzumi | |
| 6,571,206 B1 * | 5/2003 | Casano et al. | 703/25 |

(Continued)

FOREIGN PATENT DOCUMENTS

EP 0571969 5/2003

OTHER PUBLICATIONS

"Advanced DPCs", Microsoft Corporation, Nov. 1, 2006, retrieved from the Internet on Oct. 4, 2007 at http://www.microsoft.com/technet/sysinternals/information/advanceddpcs.mspx.*

(Continued)

Primary Examiner—Mark H. Rinehart
Assistant Examiner—Faisal Zaman
(74) Attorney, Agent, or Firm—Townsend and Townsend and Crew LLP (57) ABSTRACT

A driver program for a multiprocessor subsystem includes an interrupt servicing routine (ISR) and a deferred procedure call (DPC). The ISR, invoked in response to an interrupt, determines whether any of the co-processors in the multiprocessor subsystem generated an interrupt. If one of the co-processors generated an interrupt, the ISR schedules the DPC for execution and disables sending of further interrupts from all of the co-processors. The DPC services pending interrupts from any of co-processors, then re-enables sending of interrupts from the co-processors.

19 Claims, 3 Drawing Sheets

U.S. PATENT DOCUMENTS

| | | | |
|---|---|---|---|
| 6,574,693 B1 * | 6/2003 | Alasti et al. | 710/262 |
| 6,724,390 B1 | 4/2004 | Dragony et al. | |
| 6,747,654 B1 | 6/2004 | Laksono et al. | |
| 6,772,189 B1 * | 8/2004 | Asselin | 718/100 |
| 6,781,590 B2 | 8/2004 | Katsura et al. | |
| 6,813,665 B2 * | 11/2004 | Rankin et al. | 710/260 |
| 7,043,729 B2 * | 5/2006 | Lewis | 718/103 |
| 2002/0144004 A1 * | 10/2002 | Gaur et al. | 709/310 |
| 2002/0161957 A1 * | 10/2002 | Comeau et al. | 710/260 |
| 2003/0101293 A1 * | 5/2003 | Stevens | 709/330 |
| 2003/0128216 A1 | 7/2003 | Walls et al. | |
| 2003/0140179 A1 * | 7/2003 | Wilt et al. | 709/321 |
| 2003/0187914 A1 * | 10/2003 | Kaniyar et al. | 709/201 |
| 2004/0075623 A1 | 4/2004 | Hartman | |
| 2004/0111549 A1 * | 6/2004 | Connor et al. | 710/260 |
| 2004/0122997 A1 * | 6/2004 | Diamant | 710/49 |
| 2005/0012749 A1 | 1/2005 | Gonzalez | |
| 2005/0088445 A1 | 4/2005 | Gonzalez | |

OTHER PUBLICATIONS

"Deferred Procedure Call", Wikipedia.org, Sep. 19, 2007, retrieved from the Internet on Oct. 4, 2007 at http://en.wikipedia.org/wiki/Deferred_Procedure_Call.*

"Lesson 8—Interrupt and Exception Handling", Microsoft Corporation, 2007, retrieved from the Internet on Oct. 4, 2007 at http://www.microsoft.com/technet/archive/winntas/training/ntarchitectoview/ntarc_8.mspx.*

Whitman, "Dynamic Load Balancing For Parallel Polygon Rendering" IEEE Computer Graphics and Applications, IEEE Inc. New York, U.S. vol. 14, No. 4, pp. 41-48, Jul. 1, 1994.

Molnar et al., "PixelFlow: HighSpeed Rendering Using Image Composition", SIGGRAPH 92, pp. 231-240, unknown date.

* cited by examiner

SERVICING OF MULTIPLE INTERRUPTS USING A DEFERRED PROCEDURE CALL IN A MULTIPROCESSOR SYSTEM

BACKGROUND OF THE INVENTION

The present invention relates in general to processing systems, and in particular to servicing of interrupts for a multiprocessor subsystem.

Many computer systems include co-processors that support various computationally intensive features, such as graphics processing. Co-processors generally operate as slaves that receive and execute commands from a driver program executing on a central processing unit (CPU) or other master processor of the computer system. Co-processors are often operated asynchronously; that is, the CPU issues a command to the co-processor and proceeds with other operations without waiting for the co-processor to execute the command. In the course of executing commands, a co-processor may require additional services from the system (e.g., from driver programs or other programs executing on the CPU). In that event, the co-processor sends an interrupt signal to the CPU to request the needed services.

Upon detecting an interrupt, the CPU invokes a critical-priority procedure to identify the source. For example, the CPU may call interrupt servicing routines (ISRs) of various device driver programs. An ISR, as is known in the art, may be implemented as a driver program function call that tests the hardware device for which the driver is possible to detect an interrupt setting. The CPU may invoke the ISRs of various driver programs sequentially until one of the ISRs returns a signal indicating that the source has been identified or until all ISRs have been executed. (If all ISRs execute without detecting a source, the CPU may simply reset the interrupt and resume normal processing.) Typically, the CPU masks or disables all interrupts from all system components while the ISRs are executing. This effectively stalls any system component that generates an interrupt before the source of a previous interrupt has been identified.

To minimize adverse effects on system performance, the ISRs provided in hardware device driver programs are usually designed to have minimal functionality. For example, an ISR may simply identify the source of the interrupt and instruct the operating system to schedule an appropriate procedure (known in the art as a deferred procedure call, or DPC) for servicing the interrupt, then exit. The DPC, which runs in accordance with operating system scheduling rules, services the interrupt without disabling interrupts from other system components.

Recently, there has been increased interest in developing subsystems with multiple co-processors. For example, in the field of graphics processing, continually increasing demands for higher resolution and enhanced realism (e.g., for video games) has led to development of graphics processing cards that incorporate multiple graphics processing units (GPUs). These GPUs operate in parallel to render an image.

In a multi-processor graphics subsystem, each GPU typically generates interrupts independently, which tends to increase the rate at which interrupts occur. For example, two GPUs will usually generate approximately twice as many interrupts per frame as one GPU. Further, when the GPUs are performing similar operations in parallel on different data, they tend to generate simultaneous, overlapping, or duplicate interrupts. Interrupts "overlap" when a second interrupt is generated before the first interrupt is serviced by a DPC. Interrupts are "duplicates" when two GPUs generate the interrupt for the same reason (e.g., both GPUs require the same executable code). As the number of GPUs increases, so does the number of interrupts and the likelihood of simultaneous, overlapping, or duplicate interrupts.

Conventional ISRs are not scalable to multi-GPU systems. For example, the same ISR is generally invoked regardless of which GPU generated a particular interrupt. The ISR is required to identify which GPU generated the interrupt and schedule an appropriate DPC for that GPU. This increases the complexity, and therefore the execution time, of the ISR and can have an adverse effect on overall system performance because longer execution time of an ISR generally increases the likelihood that other system components will generate interrupts while the ISR is executing and be stalled. In addition, GPUs operating in parallel may tend to issue interrupts at around the same time; by the time the ISR finishes handling the first interrupt, it may immediately be needed again to handle another interrupt from another GPU. Since the ISR is invoked and executes at critical priority, delays in other (normal-priority) processing functions can be compounded, and system performance can deteriorate significantly.

Therefore, it would be desirable to provide an improved technology for handling interrupts from multiple co-processors in a more efficient, scalable manner.

BRIEF SUMMARY OF THE INVENTION

Embodiments of the present invention provide improved interrupt handling methods and systems for use with multiprocessor subsystems. In some embodiments, a multiprocessor subsystem is controlled by a driver program that includes an interrupt servicing routine (ISR) and a deferred procedure call (DPC). When invoked in response to an interrupt, the ISR determines whether any of the co-processors in the multiprocessor subsystem generated an interrupt, without necessarily identifying which one of the co-processors generated the interrupt. If one of the co-processors generated an interrupt, the ISR schedules the DPC for execution and disables sending of further interrupts from all of the co-processors. The DPC, which is executed according to the schedule, services pending interrupts from any of the co-processors, then re-enables sending of interrupts from the co-processors. This can improve system performance by reducing the time needed for the ISR to execute and by reducing the number of interrupts sent by the multiprocessor subsystem.

According to one aspect of the invention, a method is provided for servicing interrupts generated by a number of co-processors included in a multiprocessor subsystem (which may be, e.g., a graphics processing subsystem having multiple graphics processors). In response to a detected interrupt, it is determining whether the detected interrupt was generated by one of the plurality of co-processors of the multiprocessor subsystem. In the event that the detected interrupt was generated by one of the plurality of co-processors, execution of a deferred servicing procedure is scheduled; during execution the deferred servicing procedure services a plurality of pending interrupts generated by one or more of the plurality of co-processors, including the detected interrupt. For example, the servicing procedure may service all pending interrupts from all of the co-processors.

In some embodiments, the method also includes disabling further interrupts from all of the co-processors in the event that the detected interrupt was generated by one of the co-processors; during execution the deferred servicing procedure re-enables interrupts from the co-processors.

In some embodiments, the acts of determining whether the first interrupt was generated by one of the co-processors and scheduling the servicing procedure are performed at a critical priority level. The act of scheduling execution of the deferred servicing procedure may also include setting a second priority level for the deferred servicing procedure, with the second priority level being lower than the critical priority level.

According to another aspect of the invention, a computer system includes a multiprocessor sub-system and a driver module. The multiprocessor subsystem includes a number of co-processors for processing data, and each of the co-processors is configured to generate interrupts. The driver module, which is configured to control operation of the multiprocessor subsystem, includes a schedulable servicing module and an interrupt detection module. The schedulable servicing module is configured to detect and service all pending interrupts from all of the co-processors when activated, and the interrupt detection module is configured to schedule the servicing module for activation in the event of an interrupt from any one of the co-processors. In some embodiments, the interrupt detection module may be further configured to be activated by a central processing unit of the computer system in response to an interrupt signal.

The following detailed description together with the accompanying drawings will provide a better understanding of the nature and advantages of the present invention.

DETAILED DESCRIPTION OF THE INVENTION

Embodiments of the present invention provide improved interrupt handling for multiprocessor subsystems. In some embodiments, a multiprocessor subsystem is controlled by a driver program that includes an interrupt servicing routine (ISR) and a deferred procedure call (DPC). When invoked in response to an interrupt, the ISR determines whether any of the co-processors in the multiprocessor subsystem generated an interrupt, without necessarily identifying which one of the co-processors generated the interrupt. The ISR schedules the DPC for execution and disables sending of further interrupts from all of the co-processors. The DPC, which is executed according to the schedule, services pending interrupts from any of co-processors, then re-enables sending of further interrupts from the co-processors. This can improve system performance by reducing the time needed for the ISR to execute and by reducing the number of interrupts sent by the multiprocessor subsystem.

Figure 1:
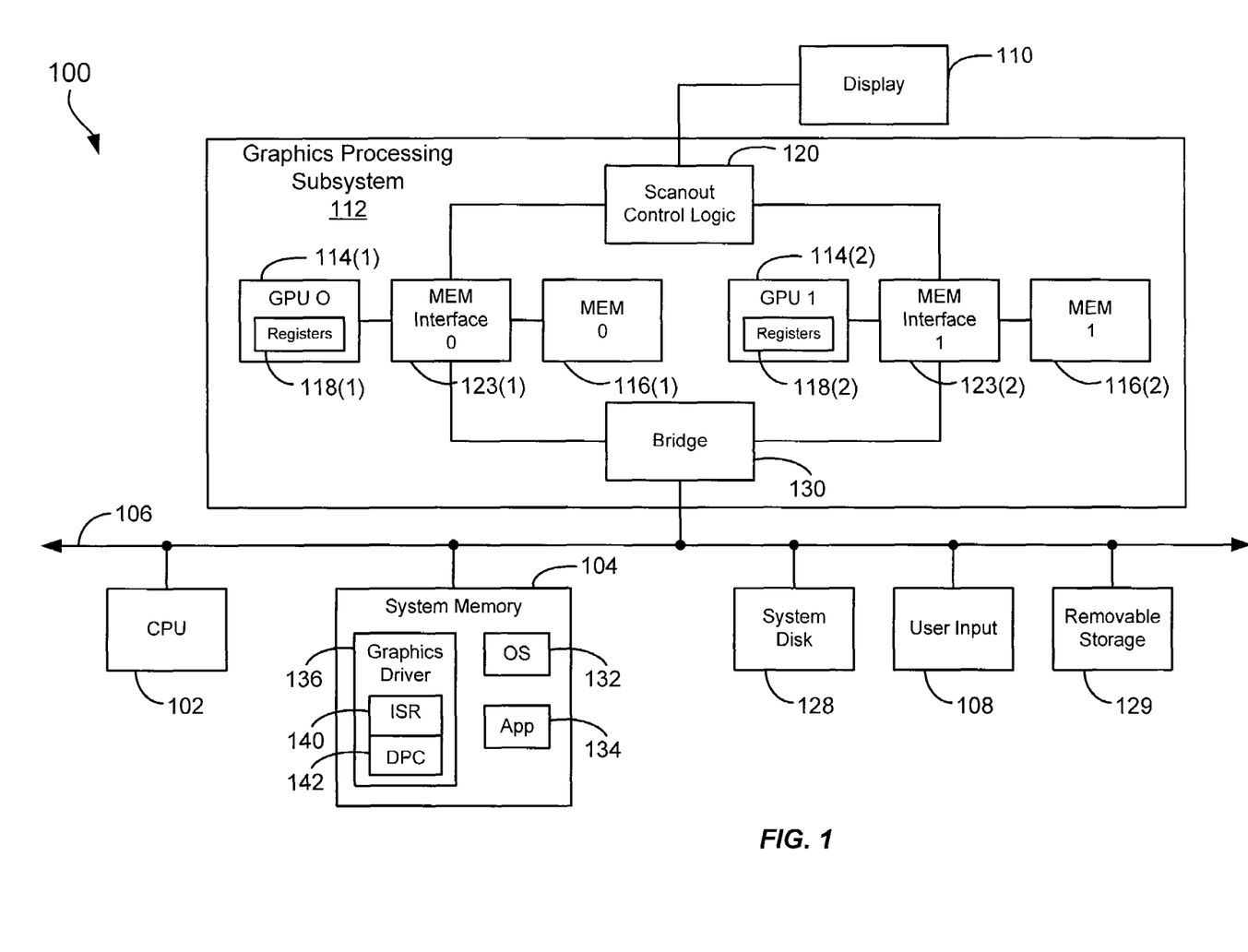
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus 106. User input is received from one or more user input devices 108 (e.g., keyboard, mouse) coupled to bus 106. Visual output is provided on a pixel based display device 110 (e.g., a conventional CRT or LCD based monitor) operating under control of a graphics processing subsystem 112 coupled to system bus 106. A system disk 128 and other components, such as one or more removable storage devices 129 (e.g., floppy disk drive, compact disk (CD) drive, and/or DVD drive), may also be coupled to system bus 106.

Graphics processing subsystem 112 is advantageously implemented using a printed circuit card adapted to be connected to an appropriate bus slot on a motherboard of system 100. For example, the bus slot may implement PCI (Peripheral Component Interconnect), PCI-E (PCI Express), AGP (Accelerated Graphics Port), or the like. In this embodiment, graphics processing subsystem 112 includes two (or more) graphics processing units (GPUs) 114, each of which is advantageously implemented as a separate integrated circuit device (e.g., programmable processor or application specific integrated circuit (ASIC)). Herein, multiple instances of like objects are denoted with reference numbers identifying the object and parenthetical numbers identifying the instance where needed.

GPUs 114 are configured to perform various rendering functions in response to instructions (commands) received via system bus 106. In some embodiments, the rendering functions correspond to various steps in a graphics processing pipeline by which geometry data describing a scene is transformed to pixel data for displaying on display device 110. These functions can include, for example, lighting transformations, coordinate transformations, scan conversion of geometric primitives to rasterized data, shading computations, shadow rendering, texture blending, and so on. Numerous implementations of rendering functions are known in the art and may be implemented in GPUs 114. GPUs 114 are advantageously configured identically so that any graphics processing instruction can be executed by either GPU with substantially identical results. Each GPU 114 has its own set of registers 118 that it uses during processing in a manner consistent with conventional processor registers.

Each GPU 114 also has an associated graphics memory 116, which may be implemented using one or more integrated circuit memory devices of generally conventional design. Graphics memories 116 may contain various physical or logical subdivisions; for example, there may be a display buffer that stores pixel data for an image (or for a part of an image) that is read by scanout control logic 120 and transmitted to display device 110 for display. This pixel data may be generated from scene data provided to GPUs 114 via system bus 106 or generated by various processes executing on CPU 102 and provided to graphics memories 116 via system bus 106. Other portions of graphics memories 116 may be used to store data required by respective GPUs 114 (such as texture data, color lookup tables, etc.), executable program code for GPUs 114, commands and/or data received from processes executing on CPU 102 and so on.

For each graphics memory 116, a memory interface 123 is also provided for controlling access to the respective graphics memory. Memory interfaces 123 can be integrated with respective GPUs 114 or with respective memories 116, or they can be implemented as separate integrated circuit devices.

Bridge unit 130 is configured to manage communication between components of graphics processing subsystem 112 (including memory interfaces 123) and other components of system 100. For example, bridge unit 130 may receive all incoming data transfer requests from system bus 106 and distribute (or broadcast) the requests to one or more of memory interfaces 123. Bridge unit 130 may also receive data transfer requests originating from components of graphics processing subsystem 112 (such as GPUs 114) that reference memory locations external to graphics processing subsystem 112 and transmit these requests via system bus 106. In some embodiments, bridge unit 130 may be integrated into one of the GPUs 114, which may act as a "master" GPU for subsystem 112.

Scanout control logic 120 reads pixel data for an image from graphics memories 116 and transfers the data to display device 110 to be displayed. Scanout can occur at a constant refresh rate (e.g., 80 Hz); the refresh rate can be a user selectable parameter and need not correspond to the rate at which new frames of image data are written to graphics memories 116 (as is known in the art). Scanout control logic 120 may also perform other operations such as adjustment of color values, generating composite screen images by combining the pixel data in either of the memories 116 with data for a video or cursor overlay image or the like obtained from either of graphics memories 116 or another data source (not shown), digital to analog conversion, and so on.

GPUs 114 are advantageously operated in parallel to increase the rate at which new frames of image data can be rendered. In one embodiment, referred to herein as "spatial parallelism," each GPU 114 generates pixel data for a different portion (e.g., a horizontal or vertical band) of each frame; for example, GPU 114(1) may generate pixel data for the top half of the frame while GPU 114(2) generates pixel data for the bottom half. Scanout control logic 120 reads a first portion (e.g., the top portion) of the pixel data for a frame from the display buffer of graphics memory 116(1) and a second portion (e.g., the bottom portion) from the display buffer of graphics memory 116(2).

During operation of system 100, CPU 102 executes various programs that are (temporarily) resident in system memory 104. In one embodiment, these programs include one or more operating system (OS) programs 132, one or more application programs 134, and a driver program 136 for graphics card 112. It is to be understood that, although these programs are shown as residing in system memory 104, the invention is not limited to any particular mechanism for supplying program instructions for execution by CPU 102. For instance, at any given time some or all of the program instructions for any of these programs may be present within CPU 102 (e.g., in an on chip instruction cache and/or various buffers and registers), in a page file or memory mapped file on a system disk, and/or in other storage space.

Operating system programs 132 and/or application programs 134 may be of conventional design. An application program 134 may be, for instance, a video game program that generates graphics data and invokes appropriate rendering functions of GPU 114 to transform the graphics data to pixel data. Another application program 134 may generate pixel data and provide the pixel data to graphics card 112 for display. It is to be understood that any number of application programs that generate pixel and/or graphics data may be executing concurrently on CPU 102. Operating system programs 132 (e.g., the Graphical Device Interface (GDI) component of the Microsoft Windows operating system) may also generate pixel and/or graphics data to be processed by graphics card 112.

Driver program 136 manages communication with graphics card 112. Driver program 136 advantageously implements one or more standard application program interfaces (APIs), such as Open GL, Microsoft DirectX, or D3D for communication with graphics card 112; any number or combination of APIs may be supported, and in some embodiments separate driver programs 136 are provided to implement different APIs. By invoking appropriate API function calls, operating system programs 132 and/or application programs 134 are able to instruct driver program 136 to transfer graphics data or pixel data to graphics card 112 via system bus 106, to invoke various rendering functions of GPUs 114, and so on. The specific commands and/or data transmitted to graphics card 112 by driver program 136 in response to an API function call may vary depending on the implementation of GPUs 114, and driver program 136 may also transmit commands and/or data implementing additional functionality (e.g., special visual effects) not controlled by operating system programs 132 or application programs 134.

In some embodiments, driver program 136 is configured to service one of GPUs 114 (referred to as the "active" GPU) at a time. When one GPU, e.g., GPU 114(1), is selected as active, driver program 136 creates a mapping to the registers 118(1) of the active GPU 114(1), thereby making the registers accessible to driver program 136. Such mappings are known in the art. When the other GPU 114(2) is subsequently selected, driver program 136 loads a new mapping (or swaps mappings) so that the registers 118(2) of the new active GPU 114(2) are made accessible to driver program 136. By swapping mappings, driver program 136 can interact with either of GPUs 114. In some embodiments, a "broadcast" mapping is also provided that enables driver program 136 to transmit data to registers of all GPUs 114 concurrently.

In an embodiment of the present invention, driver program 136 also includes one or more interrupt service routines (ISR) 140 and one or more deferred procedure calls (DPC) 142. ISR 140 and DPC 142 are used to handle interrupts received from the GPUs 114.

More specifically, as an application program 134 executes, it may invoke various API function calls of graphics driver program 136, and graphics driver program 136 may respond to the function calls by sending appropriate commands to GPUs 114. In various embodiments, commands may be sent in a broadcast mode (i.e., all GPUs 114 receive the command) or a unicast mode (i.e., the command is directed to a specific one of GPUs 114). Some embodiments allow switching between broadcast and unicast modes. Other embodiments, which may include more than two GPUs, may also support a multicast mode in which commands can be directed to any subset of the GPUs. Various broadcast, unicast, and/or multicast techniques known in the art, including register mappings and/or memory mappings of driver program 136, may be used for such communication.

During the course of executing a command, GPU 114(1) (or 114(2)) may require services provided by driver program 136 or by other programs executing on CPU 102. For example, GPU 114(1) may need driver program 136 to transfer additional code to a local code cache (not shown) of GPU 114(1) for execution, or there may be an error or exception that requires handling by driver program 136, or the like. In such situations, GPU 114(1) generates an interrupt signal that is transmitted to CPU 102 via system bus 106. Depending on system configuration, this interrupt signal might or might not include an indication that GPU 114(1) or graphics processing subsystem 112 was the source of the interrupt.

In some embodiments, when GPU 114(1) (or 114(2)) generates an interrupt, it also stores interrupt data in one or more of its registers 118(1) (118(2)). The interrupt data indicates that an interrupt exists and advantageously also provides additional data for use in servicing the interrupt. For example, one of registers 118 may store a condition code that indicates the particular condition that needs to be serviced (e.g., what program code is to be transferred, which error occurred, etc.). Numerous conditions and mechanisms for generating interrupts and interrupt data are known in the art, and a detailed description is omitted as not being critical to understanding the present invention.

The interrupt signal is received by CPU 102, which invokes ISR 140. ISR 140 may be invoked, e.g., as part of a conventional interrupt handling procedure in which an OS program 132 executing on CPU 102 sequentially invokes the ISRs of various driver programs until the source of the interrupt is found. ISR 140 determines whether an interrupt was generated within graphics processing subsystem 112 (e.g., by either of GPUs 114) and does not necessarily identify the particular source of the interrupt (e.g., which of GPUs 114 generated the interrupt). If the interrupt was generated within graphics processing subsystem 112, ISR 140 invokes a function call of OS 132 to schedule execution of DPC 142. ISR 140 may also notify CPU 102 that the source of the interrupt has been found. ISR 140 also advantageously disables further interrupt signals from any of GPUs 114 from being transmitted to CPU 102; GPUs 114 may continue to generate interrupt data and store such data in registers 118.

When DPC 142 executes, it advantageously services all pending interrupts from any of GPUs 114, including the interrupt that caused DPC 142 to be scheduled as well as any subsequent interrupts that were generated after ISR 140 disabled sending of interrupt signals to CPU 102. Servicing of each interrupt depends on the particular interrupt condition and may include, e.g., transferring code and/or data to graphics processing subsystem 112, executing an error-handling routine, or the like. DPC 142 also re-enables sending of interrupts from GPUs 114. It should be noted that because DPC 142 is configured to service all interrupts from all of GPUs 114, there is no need to schedule multiple occurrences of DPC 142; thus, once ISR 140 has scheduled DPC 142, disabling further interrupts from GPUs 114 does not interfere with servicing of such interrupts. Specific implementations of ISR 140 and DPC 142 are described below.

Depending on system configuration, ISR 140 may be invoked at a critical (highest) priority level. In addition, while executing any interrupt servicing routine, including ISR 140, CPU 102 may mask or disable any other interrupts. This temporarily stalls any component of system 100 that generates an interrupt while ISR 140 (or another ISR) is executing. Accordingly, it is desirable to minimize the execution time for ISR 140 so that the effect on performance of system 100 is negligible.

DPC 142 is advantageously scheduled at a priority level that, while higher than the normal priority level at which programs generally execute, is lower than the critical priority level given to ISR 140. For instance, the Microsoft Windows operating system defines a "DPC" priority level that may be used. Other priority levels may also be used.

It will be appreciated that the system described herein is illustrative and that variations and modifications are possible. For instance, while two GPUs, with respective memories, are shown, any number of GPUs may be used, and multiple GPUs might share a memory. One or more (or all) of the GPUs may also use system memory in addition to or instead of graphics memory. The memory interfaces described herein may be integrated with a GPU and/or a memory in a single integrated circuit device (chip) or implemented as separate chips. The bridge unit may be integrated with any of the memory interface and/or GPU chips, or may be implemented on a separate chip. Memory may be implemented using one or more suitable integrated circuit devices or other memory technologies known in the art. Processors and logic devices may be provided using one or more suitable integrated circuit devices (e.g., ASICs, programmable processors, special-purpose processing circuits, etc.). In addition, the number of GPUs in use may be configurable, e.g., by setting parameter values in the graphics driver program, so that not all GPUs of a system are required to be in use at all times.

Graphics processing subsystems may be implemented using various expansion card formats and bus protocols, including PCI, PCI-E, AGP, and so on. Some or all of the components of a graphics processing subsystem may be mounted directly on a motherboard; for instance, one of the GPUs might be a motherboard mounted graphics co-processor. Computer systems suitable for practicing the present invention may also include various other components, such as high speed DMA (direct memory access) chips, and a single system may implement multiple bus protocols (e.g., any combination of PCI, PCI-E, and AGP buses may be present) with appropriate components provided for interconnecting the buses. Other components of the computer system, such as user input devices and storage devices, may also be varied from those shown and described without departing from the scope of the invention.

An example of ISR 140 according to one embodiment of the present invention will now be described. In this embodiment, ISR 140 is implemented as a function call of graphics driver program 136 that is invoked by an OS program 132 when CPU 102 detects an interrupt. It is to be understood that, when ISR 140 is invoked, CPU 102 need not have information as to which component of system 100 generated the interrupt; ISR 140 might be invoked in sequence or in parallel with other interrupt handling routines of other driver programs.

Figure 2:
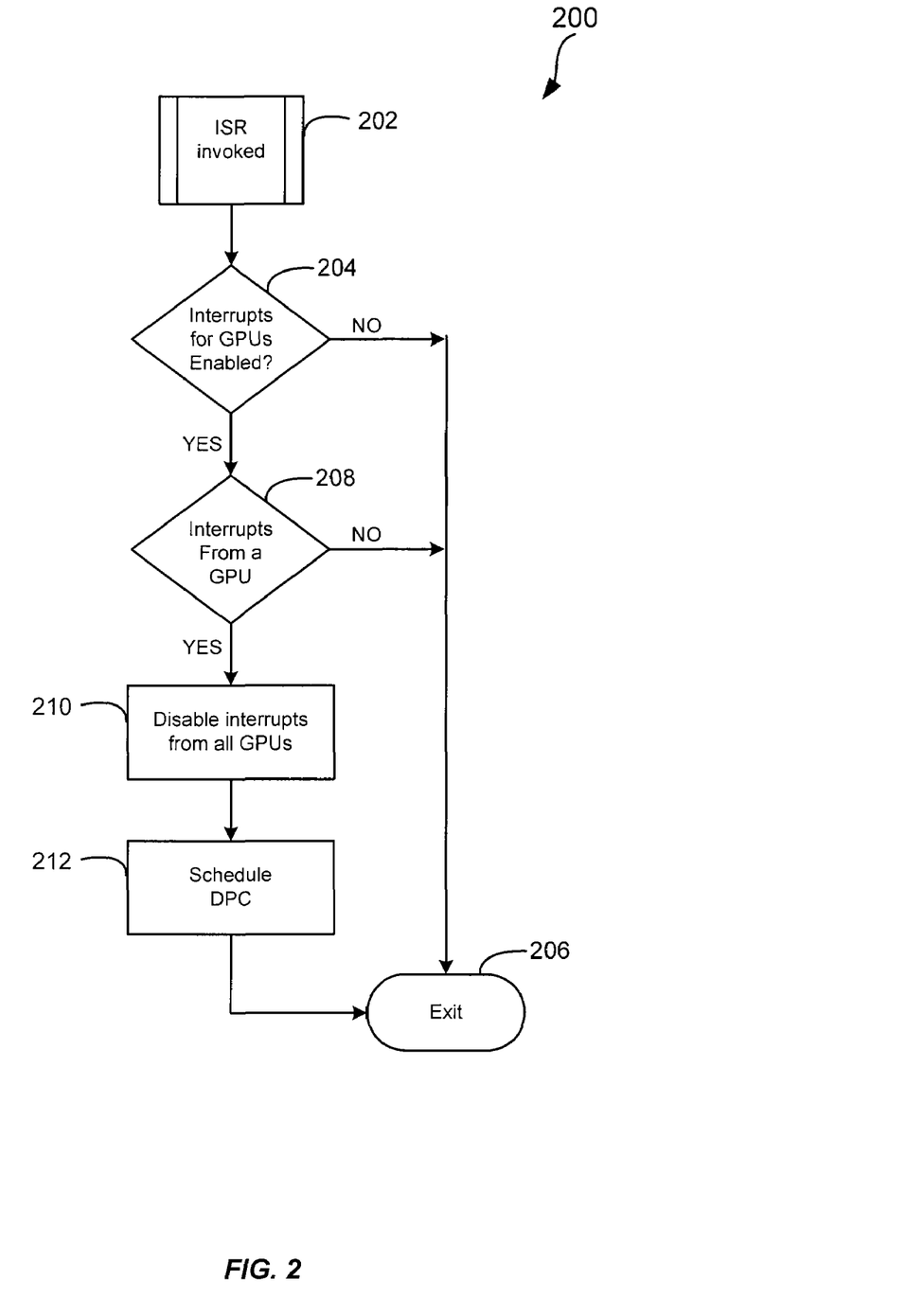
FIG. 2 is a flow diagram of processing steps for an interrupt servicing routine according to an embodiment of the present invention.

FIG. 2 is a flow diagram of a process 200 implementing ISR 140 according to an embodiment of the present invention. ISR 140 is invoked (step 202) when CPU 102 receives an interrupt. As mentioned above, CPU 102 may also disable or mask interrupts from all system components while ISR 140 is executing.

At step 204, ISR 140 determines whether GPU interrupts are enabled, i.e., whether it is possible that the source of the interrupt is one of the GPUs. As is known in the art, interrupts can be disabled for particular system components, e.g., while a previously detected interrupt is pending (e.g., waiting for service from a scheduled DPC). If GPU interrupts are not enabled, then ISR 140 exits at step 206. When ISR 140 exits, control returns to CPU 102, which may continue to search for the source of the interrupt or perform other operations dependent on its programming; such operations are not critical to the present invention.

If GPU interrupts are enabled, then at step 208, ISR 140 determines whether the interrupt was generated by any one of the GPUs 114. This can be done, e.g., by inspecting the registers 118 of each GPU 114 in turn until either an interrupt is found or all GPUs 114 have been inspected. In this embodiment, ISR 140 advantageously proceeds to step 210 as soon as an interrupt from one GPU is found and does not check any remaining GPUs.

Like other functions of driver program 136, ISR 140 can inspect the registers 118 of a particular GPU 114 by swapping in the appropriate register mapping and then accessing the registers. It should be noted that where ISR 140 executes at critical priority, it may be invoked during any stage of operation of driver program 136, including while driver program 136 is itself changing active GPUs and swapping register mappings. To prevent errors in operation of driver program 136, ISR 140 is advantageously provided with its own set of register mappings that are independent of the rest of driver program 136. In this embodiment, any swapping of register mappings done by ISR 140 has no effect on the rest of driver program 136, so that when ISR 140 exits, an element of driver program 136 that was interrupted can resume processing without error.

If, during step 208, an interrupt is detected from any one of the GPUs 114, then ISR 140 disables further interrupts from all of the GPUs 114 at step 210, e.g., by updating the GPU registers 118 in a broadcast mode. "Disabling" in this context refers to preventing GPUs 114 from sending interrupt messages to CPU 102; a GPU 114 that requires services from driver program 136 (or other system components) may update its interrupt data in its registers 118 while interrupts are disabled.

At step 212, ISR 140 schedules DPC 142 for execution. ISR 140 then exits at step 206. If no interrupt from any GPU 114 is detected during step 208, ISR 140 exits at step 206 without scheduling DPC 142.

It should be noted that ISR 140 is not required to identify which GPU 114 generated an interrupt or to find every GPU 114 that might have generated an interrupt. Nor is ISR 140 required to determine the condition that caused the interrupt to be generated. As described below, DPC 142 services all pending interrupts from all GPUs 114 and does not need information as to which interrupt triggered ISR 140. Thus, ISR 140 is capable of executing quickly so that any delay in detecting interrupts from other system components does not adversely affect system performance.

In addition, when ISR 140 detects any GPU interrupt, it disables all further interrupts from all GPUs. Accordingly, after ISR 140 has executed once and scheduled DPC 142, it does not need to perform further scheduling until DPC 142 has actually executed. Although CPU 102 may invoke ISR 140 while execution of DPC 142 is pending, ISR 140 is advantageously configured to detect that GPU interrupts are disabled (step 204) and to exit without performing further processing. In such cases, ISR 140 executes very quickly, reducing its effect on system performance. Moreover, to the extent that disabling all GPU interrupts while execution of DPC 142 is pending reduces the number of interrupts that CPU 102 receives from graphics processing subsystem 112, system performance is further enhanced.

It will be appreciated that the ISR process described herein is illustrative and that variations and modifications are possible. Steps described as sequential may be executed in parallel, order of steps may be varied, and steps may be modified or combined. For example, some embodiments of a multi-processor graphics subsystem may provide a global interrupt register that is set to a logical true state when any of the GPUs generates an interrupt; the ISR process may simply check the global register rather than checking the registers of individual GPUs. In some embodiments, different GPUs might have different driver programs; for example, multiple GPUs or multiple graphics cards are sometimes provided to drive different display devices using different input data. In such a case, there might be more than one ISR, and each ISR would examine and disable interrupts from the subset of the GPUs for which it is responsible.

Figure 3:
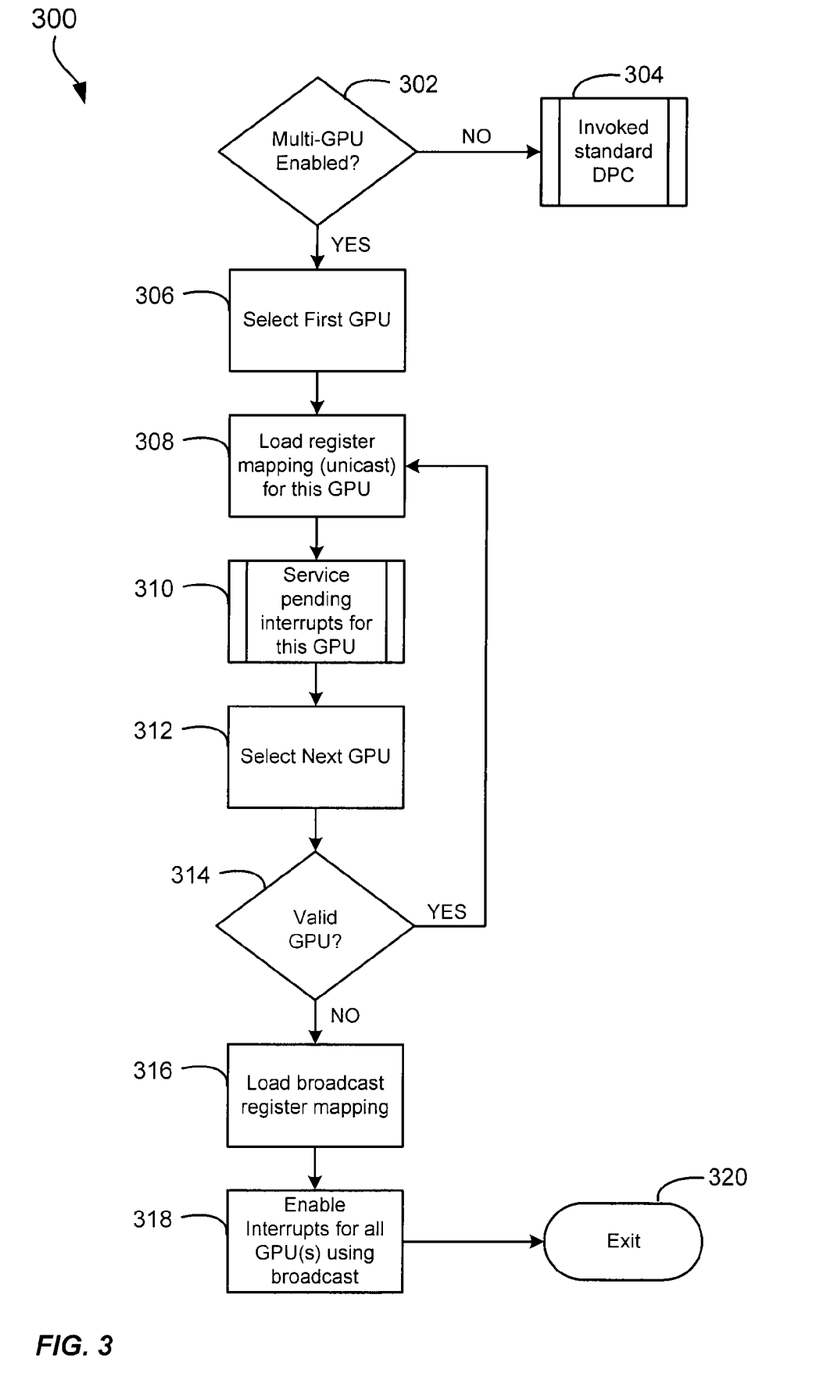
FIG. 3 is a flow diagram of processing steps for a deferred procedure call according to an embodiment of the present invention.

FIG. 3 is a flow diagram of a process 300 implementing DPC 142 according to an embodiment of the present invention. Process 300 includes a loop over all GPUs 114; for each GPU 114 process 300 detects and services any pending interrupts. When all pending interrupts from all GPUs 114 have been serviced, process 300 re-enables interrupts for all GPUs 114 and exits.

More specifically, at step 302, DPC 142 determines whether the graphics processing subsystem is currently operating in a multi-GPU configuration. For example, DPC 142 may inspect a parameter of driver program 136 that indicates the number of GPUs currently enabled. If the subsystem is not in a multi-GPU configuration, DPC 142 invokes a "standard" DPC routine (step 304) that does not loop over multiple GPUs. A DPC routine suitable for use at step 304 may be of generally conventional design, and a detailed description is omitted as not being critical to understanding the present invention.

If, at step 302, the subsystem is found to be in a multi-GPU configuration, then at step 306, DPC 142 selects a first one of GPUs 114 for processing. For purposes of looping over GPUs, it is convenient to designate an order among the GPUs that DPC 142 may use consistently, so that DPC 142 need not know which GPU 114 generated the interrupt that caused ISR 140 to schedule DPC 142. The order of GPUs in the DPC loop may be established in any manner desired. For example, in some embodiments, one GPU 114 may be designated as the "master" that receives all incoming data and commands from the system bus and forwards them to other GPUs 114. Where there is a master GPU, it can be selected first. As another example, in embodiments where spatial parallelism is used, the ordering of GPUs 114 might be based on the division of the display area among the GPUs (e.g., the GPU assigned to render the top portion of the display area might be first, and so on, with the GPU assigned to render the bottom portion being last). In still other embodiments, each GPU 114 has a unique identifier value (e.g., for purposes of unicast and/or multicast data transfers), and the ordering may be based on the identifiers.

At step 308, DPC 142 loads (or swaps in) a mapping to the registers of the selected GPU 114, and at step 310, DPC 142 services any and all pending interrupts for the selected GPU 114. Servicing of interrupts may be done using conventional techniques, such as reading a condition code from an interrupt register and selecting appropriate responses (e.g., invoking an error-handling routine or transferring program code and/or data to the selected GPU 114) based on the condition code.

At step 312, after all interrupts for the selected GPU have been processed, DPC 142 selects the next GPU. At step 314, DPC 142 determines whether the newly selected GPU 114 is valid (e.g., by inspecting a parameter of driver program 136). If so, then process 300 returns to step 308 to load the register mapping and service the interrupts for this GPU 114.

Various conditions might cause a GPU to be invalid. For instance, in some embodiments where fewer than all of the GPUs 114 might be in use at a given time, any unused GPUs may be marked invalid. In other embodiments, the GPUs are identified using sequential numerical values and selection of the next GPU at step 312 is done by incrementing the counter; a counter value greater than the largest GPU identifier may be treated as an invalid GPU.

In this embodiment, the GPUs 114 are advantageously ordered such that all valid GPUs precede any invalid GPUs, and detection of an invalid GPU signals that all GPUs 114 have had their interrupts serviced. Accordingly, if an invalid GPU is detected at step 314, then at step 316, process 300 loads (or swaps in) a broadcast register mapping that enables concurrent access to the registers of all GPUs 114 (or all valid GPUs). At step 318, process 300 broadcasts a signal to all GPUs that re-enables their interrupts, and at step 320, process 300 exits.

It will be appreciated that the DPC process described herein is illustrative and that variations and modifications are possible. Steps described as sequential may be executed in parallel, order of steps may be varied, and steps may be modified or combined. In some embodiments, invalid GPUs may be found before all valid GPUs have been selected, and the process may be modified to simply skip an invalid GPU and select the next GPU until all GPUs have been serviced. In some embodiments, after servicing the last GPU, DPC 142 may return to the first GPU to determine whether any new interrupts have occurred while other GPUs were being serviced and service such interrupts.

Use of a broadcast mapping for re-enabling GPU interrupts is also not required. For example, the DPC may loop over the GPUs to service any pending interrupts, then loop over the GPUs again, re-enabling interrupts from each in turn. In this configuration, it is possible that a re-enabled GPU may generate an interrupt before the DPC has re-enabled interrupts for all of the GPUs. In response, the ISR would interrupt the re-enabling loop of the DPC and disable interrupts from the GPUs; the DPC would resume and re-enable any GPUs that had not been enabled before the interrupt. Such GPUs could then issue further interrupts.

To avoid this situation, the DPC is advantageously configured to prevent any GPU from generating a new interrupt until all GPUs have been re-enabled. In some embodiments, the DPC uses a broadcast mode, as described above, so that interrupts for all GPUs are re-enabled at substantially the same time. In other embodiments, the DPC uses a re-enabling loop that executes at critical priority (so that execution of the ISR is deferred until the re-enabling loop completes). In still other embodiments, the DPC uses a re-enabling loop and masks out all CPU interrupt lines for the duration of the loop (which may be milliseconds or microseconds, depending on system configuration.)

The embodiments described herein provide systems and methods for handling interrupts generated by individual co-processors within a multiprocessor subsystem. The ISR process that runs at critical priority is designed for short execution time so that the presence of multiple co-processors generating sequential, overlapping, or duplicate interrupts does not adversely affect overall system performance. In the embodiments described herein, the ISR is not required to identify which co-processor generated the interrupt, only that it was a component of the multiprocessor subsystem. In response to detecting such an interrupt, the ISR schedules a DPC that services interrupts from all of the co-processors in the subsystem and also disables further interrupts from all of the co-processors from being sent to the CPU. Thus, it is not necessary to invoke an ISR or schedule a DPC for each interrupt or for each co-processor that generates an interrupt. Accordingly, embodiments of the present invention may yield measurable improvements in scalability and efficiency of multiprocessor subsystems.

While the invention has been described with respect to specific embodiments, one skilled in the art will recognize that numerous modifications are possible. For instance, in embodiments for graphics processing, any number of GPUs may be supported. The GPUs need not be on a single card; they may be distributed among multiple cards communicating over a suitable high-speed bus (e.g., AGP or PCI-E). In a multicard subsystem, each card may include one or more GPUs. For example, a three-GPU system may be implemented using a first card that has two GPUs and a second card that has one GPU. In addition, one or more GPUs of a multichip subsystem may be implemented as an integrated graphics processor (IGP) in a motherboard chipset, and one or more IGPs may operate in conjunction with one or more graphics cards (each of which may have one or more GPUs) to provide a multichip graphics processing subsystem.

The multichip graphics processing subsystem may be incorporated into a variety of computing systems, including general-purpose desktop, laptop, or tablet PC systems, video game consoles, handheld devices, or the like.

The interrupt handling functions described herein may be implemented in software, which may be written using suitable high-level languages (e.g., C, Pascal) and compiled into executable code for a particular platform. API or OS function calls may be provided, e.g., using dynamic link libraries or other suitable technology for supporting interaction among programs.

Computer programs, such as graphics driver programs, incorporating various features of the present invention may be encoded on various computer readable media for storage and/or transmission; suitable media include magnetic disk or tape, optical storage media such as compact disk (CD) or DVD (digital versatile disk), flash memory, and carrier signals adapted for transmission via wired, optical, and/or wireless networks conforming to a variety of protocols, including the Internet. Computer readable media encoded with the program code may be packaged with a compatible device or provided separately from other devices (e.g., via Internet download).

In addition, those of ordinary skill in the art with access to the present teachings will recognize that similar interrupt servicing processes may be provided for other hardware subsystems that incorporate multiple co-processors (or multiple sources of interrupts), and the invention is accordingly not limited to graphics processing subsystems.

Thus, although the invention has been described with respect to specific embodiments, it will be appreciated that the invention is intended to cover all modifications and equivalents within the scope of the following claims.

What is claimed is:

1. A method for servicing interrupts generated by a plurality of co-processors included in a multiprocessor subsystem, the method comprising the acts of:
   in response to a detected interrupt, determining whether the detected interrupt was generated by one of the plurality of co-processors of the multiprocessor subsystem; and
   in the event that the detected interrupt was generated by one of the plurality of co-processors, scheduling execution of a deferred servicing procedure,
   wherein during execution the deferred servicing procedure services a plurality of pending interrupts generated by two or more of the plurality of co-processors, including the detected interrupt,
   wherein the act of determining whether the detected interrupt was generated by one of the plurality of co-processors includes the acts of:
      selecting one of the plurality of co-processors as a current co-processor; and
      reading a value stored in an interrupt register of the current co-processor, and
   wherein the act of reading includes:
      updating a private register mapping to enable access to the interrupt register of the current co-processor,
      wherein the private mapping is not used by the deferred servicing procedure.

2. The method of claim 1, wherein during execution the deferred servicing procedure services all pending interrupts from all of the plurality of co-processors.

3. The method of claim 2, wherein servicing all pending interrupts from all of the plurality of co-processors comprises:
loading by the deferred servicing procedure a mapping to the registers of a next co-processor to be serviced; and
servicing any and all pending interrupts stored in the registers of the next co-processor.

4. The method of claim 1, wherein the plurality of pending interrupts serviced by the deferred servicing procedure includes a second interrupt generated by the one of the plurality of co-processors that generated the detected interrupt.

5. The method of claim 1, wherein the plurality of pending interrupts serviced by the deferred servicing procedure includes a second interrupt generated by one of the plurality of co-processors other than the one that generated the detected interrupt.

6. The method of claim 1, wherein in the event that the value stored in the interrupt register does not indicate an interrupt, a different one of the co-processors is selected and the act of reading is repeated.

7. The method of claim 1, further comprising the act of disabling further interrupts from the plurality of co-processors in the event that the detected interrupt was generated by one of the plurality of co-processors,
wherein during execution the deferred servicing procedure re-enables interrupts from the plurality of co-processors.

8. The method of claim 7, wherein the act of disabling further interrupts is performed at a critical priority level.

9. The method of claim 1, wherein the act of determining whether the detected interrupt was generated by one of the plurality of co-processors is performed at a critical priority level.

10. The method of claim 9, wherein the act of scheduling execution of the deferred servicing procedure is performed at the critical priority level.

11. The method of claim 10, wherein the act of scheduling execution of the deferred servicing procedure includes setting a second priority level for the deferred servicing procedure, wherein the second priority level is lower than the critical priority level.

12. The method of claim 1, wherein the multiprocessor subsystem is a graphics processing subsystem.

13. The method of claim 1, further comprising:
determining whether interrupts from the plurality of co-processors are enabled; and
if the interrupts from the plurality of co-processors are not enabled, exiting without performing further processing.

14. A computer system comprising:
a multiprocessor subsystem including a plurality of co-processors for processing data, wherein each of the co-processors is configured to generate interrupts; and
a driver module configured to control operation of the multiprocessor subsystem, the driver module including:
a schedulable servicing module configured to detect and service all pending interrupts from all of the co-processors when activated; and
an interrupt detection module configured to schedule the servicing module for activation in the event of an interrupt from any one of the plurality of co-processors,
wherein each of the plurality of co-processors includes an interrupt register configured to indicate an interrupt, and wherein the interrupt detection module is further configured to determine whether one of the plurality of co-processors generated an interrupt by accessing the respective interrupt registers of the co-processors,
wherein the interrupt detection module is further configured to maintain a private mapping for accessing the respective interrupt registers, the private mapping being used exclusively by the interrupt detection module.

15. The system of claim 14 wherein the interrupt detection module is further configured to be activated by a central processing unit of the computer system in response to an interrupt signal.

16. The system of claim 14, wherein the interrupt detection module is further configured to disable further interrupts from all of the co-processors in the event of an interrupt from any one of the co-processors, and wherein the servicing module is further configured to re-enable further interrupts from all of the co-processors.

17. The system of claim 14, wherein the interrupt detection module is further configured to operate at a critical priority level and the servicing module is further configured to operate at a second priority level lower than the critical priority level.

18. The system of claim 14, wherein the multiprocessor subsystem is configured for graphics processing.

19. A computer program product comprising a computer readable storage medium encoded with program code, the program code including:
program code for determining, in response to a detected interrupt, whether the detected interrupt was generated by one of the plurality of co-processors of the multiprocessor subsystem;
program code for scheduling a deferred servicing procedure in the event that the detected interrupt was generated by one of the plurality of co-processors; and
program code for performing the deferred servicing procedure, wherein the program code for performing the deferred servicing procedure includes program code for servicing a plurality of pending interrupts from two or more of the plurality of processors, including the detected interrupt,
wherein the program code for determining whether the detected interrupt was generated by one of the plurality of co-processors includes program code for:
selecting one of the plurality of co-processors as a current co-processor; and
reading a value stored in an interrupt register of the current co-processor, and
wherein the program code for reading includes:
program code for updating a private register mapping to enable access to the interrupt register of the current co-processor, wherein the private mapping is not used by the deferred servicing procedure.

* * * * *